US009681446B2

(12) United States Patent
Li et al.

(10) Patent No.: US 9,681,446 B2
(45) Date of Patent: Jun. 13, 2017

(54) FLEXIBLE GAUSSIAN MINIMUM SHIFT KEYING IN A CELLULAR INTERNET OF THINGS SYSTEM

(71) Applicant: QUALCOMM Incorporated, San Diego, CA (US)

(72) Inventors: Junyi Li, Chester, NJ (US); Frank Anton Lane, Easton, PA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 14/510,857

(22) Filed: Oct. 9, 2014

(65) Prior Publication Data

US 2016/0105891 A1 Apr. 14, 2016

(51) Int. Cl.
*H04W 4/00* (2009.01)
*H04W 72/04* (2009.01)
(Continued)

(52) U.S. Cl.
CPC ......... *H04W 72/0453* (2013.01); *H04J 11/00* (2013.01); *H04L 5/0044* (2013.01); *H04L 5/0058* (2013.01); *H04L 27/2614* (2013.01); *H04L 27/2636* (2013.01); *H04W 4/005* (2013.01); *H04J 2011/0009* (2013.01)

(58) Field of Classification Search
CPC combination set(s) only.
See application file for complete search history.

(56) References Cited

U.S. PATENT DOCUMENTS 6,175,550 B1  1/2001  van Nee
6,208,663 B1  3/2001  Schramm et al.
(Continued)

FOREIGN PATENT DOCUMENTS

WO  WO-0215435 A1  2/2002

OTHER PUBLICATIONS

Guan et al., "Modelling and Simulation of an RF-DAC Based Transmitter at Architectural Level in SystemC/AMS," 2010 Conference on Ph.D. Research in Microelectronics and Electronics (PRIME), Berlin, Jul. 18-21, 2010, 4 pgs., XP_31764357A, Institute of Electrical and Electronics Engineers.
(Continued)

*Primary Examiner* — Yemane Mesfin
*Assistant Examiner* — Mon Cheri Davenport
(74) *Attorney, Agent, or Firm* — Holland & Hart

(57) ABSTRACT

Methods, systems, and devices are described for wireless communication at a UE. A user equipment (UE) may utilize orthogonal frequency division multiple access (OFDMA) for demodulating downlink messages and a combination of Gaussian minimum shift keying (GMSK) and single carrier frequency division multiple access (SC-FDMA) for uplink modulation. The uplink modulation process may include generating a symbol vector with an M-point discrete Fourier transform (DFT), filtering the symbol vector with a frequency domain Gaussian filter, generating a sample vector from the filtered symbol vector utilizing an inverse DFT, and modulating the sample vector utilizing GMSK. In some cases, the uplink modulation may be based on a narrowband resource allocation received from a base station.

26 Claims, 13 Drawing Sheets

(51) Int. Cl.
*H04J 11/00* (2006.01)
*H04L 5/00* (2006.01)
*H04L 27/26* (2006.01)

(56) References Cited

U.S. PATENT DOCUMENTS

| | | |
|---|---|---|
| 8,768,373 B2 | 7/2014 | Soliman et al. |
| 2009/0147669 A1 | 6/2009 | Green |
| 2011/0164698 A1 | 7/2011 | Wu |
| 2015/0282008 A1* | 10/2015 | Cao ................ H04W 4/005 370/310 |
| 2016/0182270 A1* | 6/2016 | Jungnickel ........ H04W 72/0453 375/260 |

OTHER PUBLICATIONS

ISA/EPO, International Search Report and Written Opinion of the International Searching Authority, Int'l App. No. PCT/US2015/051180, Dec. 4, 2015, European Patent Office, Rijswijk, NL, 13 pgs.

Neul et al., "Introduction to "Clean-Slate" Cellular IoT Radio Access Solution," eBook, Apr. 14, 2010, 15 pgs., XP_55231127A, URL:http://www.cambridgewireless.co.uk/docs/Clean Slate Cellular 10.04.14.pdf [retrieved from the internet on Nov. 25, 2015], Cambridge Wireless Ltd., UK.

Rahman et al., "Power Efficient Uplink LTE with CPM-SC-IFDMA," 2011—MILCOM 2011 Military Communications Conference, Baltimore, MD, Nov. 7-10, 2011, pp. 507-512, ISBN 978-1-4673-0079-7, XP_32092988A, Institute of Electrical and Electronics Engineers.

Wylie-Green et al., "Power and Spectrally Efficient Multiple Access Using CPM Over SC-FDMA," 2010 IEEE 71st Vehicular Technology Conference (VTC 2010-Spring), Taipei, Taiwan, May 16-19, 2010, 5 pgs., XP_31696138A, Institute of Electrical and Electronics Engineers.

IPEA/EP, Second Written Opinion of the International Preliminary Examining Authority, Int'l Application No. PCT/US2015/051180, Sep. 29, 2016, European Patent Office, Berlin, DE, 6 pgs.

\* cited by examiner

FLEXIBLE GAUSSIAN MINIMUM SHIFT KEYING IN A CELLULAR INTERNET OF THINGS SYSTEM

BACKGROUND

Field of Disclosure

The following relates generally to wireless communication, and more specifically to flexible Gaussian minimum shift keying in a cellular Internet of Things (IoT) system.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may be otherwise known as a user equipment (UE). A base station may communicate with UEs on downlink channels (e.g., for transmissions from a base station to a UE) and uplink channels (e.g., for transmissions from a UE to a base station).

Some UEs may provide for automated communication. Automated UEs may include those implementing Machine-to-Machine (M2M) communication or Machine Type Communication (MTC). M2M or MTC may refer to data communication technologies that allow devices to communicate with one another or a base station without human intervention. M2M or MTC devices may include UEs and may be used as part of an Internet of Things (IoT). Some M2M or MTC devices in an IoT may include parking meters, water and gas meters, and other sensors that may infrequently communicate small amounts of data.

In some cases, including in an IoT, a UE may be a power limited device, and UL transmissions may be a significant drain on the available power resources of the device (i.e., the battery). The modulation scheme used by the device may significantly impact the power usage. For example, some modulation schemes may have a high peak-to-average power ratio (PAPR), which may result in high power usage and/or limited range in some conditions.

SUMMARY

The present disclosure may relate generally to wireless communications systems, and more particularly to improved systems, methods, and/or apparatuses for flexible Gaussian minimum shift keying (GMSK) in a cellular Internet of Things (IoT) system. A user equipment (UE) may utilize orthogonal frequency division multiple access (OFDMA) for demodulating downlink messages and a combination of GMSK and single carrier frequency division multiple access (SC-FDMA) for uplink modulation. The uplink modulation process may include generating a symbol vector with an M-point discrete Fourier transform (DFT), filtering the symbol vector with a frequency domain Gaussian filter, generating a sample vector from the filtered symbol vector utilizing an inverse DFT, and modulating the sample vector utilizing GMSK. In some cases, the uplink modulation may be based on a narrowband resource allocation received from a base station.

A method of wireless communication at a UE is described. The method may include receiving a narrowband resource allocation from a base station, modulating an outgoing message utilizing GMSK and SC-FDMA modulation, and transmitting the outgoing message using the narrowband resource allocation.

An apparatus for wireless communication at a UE is described. The apparatus may include means for receiving a narrowband resource allocation from a base station, means for modulating an outgoing message utilizing GMSK and SC-FDMA modulation, and means for transmitting the outgoing message using the narrowband resource allocation.

A further apparatus for wireless communication at a UE is described. The apparatus may include a processor, memory in electronic communication with the processor, and instructions stored in the memory, wherein the instructions are executable by the processor to receive a narrowband resource allocation from a base station, modulate an outgoing message utilizing GMSK and SC-FDMA modulation, and transmit the outgoing message using the narrowband resource allocation.

A non-transitory computer-readable medium storing code for wireless communication at a UE is described. The code may include instructions executable to receive a narrowband resource allocation from a base station, modulate an outgoing message utilizing GMSK and SC-FDMA modulation, and transmit the outgoing message using the narrowband resource allocation.

Some examples of the method, apparatuses, and/or non-transitory computer-readable medium described above may further include demodulating an incoming message utilizing OFDMA modulation. Additionally or alternatively, in some examples modulating the outgoing message comprises generating a symbol vector with an M-point DFT, filtering the symbol vector with a frequency domain Gaussian filter, generating a sample vector from the filtered symbol vector utilizing an inverse DFT, and modulating the sample vector utilizing GMSK.

In some examples of the method, apparatuses, and/or non-transitory computer-readable medium described above, the narrowband resource allocation is based on a power limitation of the UE. Additionally or alternatively, in some examples a bandwidth of the narrowband resource allocation is a multiple of a smallest narrowband carrier bandwidth.

Some examples of the method, apparatuses, and/or non-transitory computer-readable medium described above may further include filtering the outgoing message based on a filter bandwidth that is flexible in the digital domain. Additionally or alternatively, in some examples the filter bandwidth is increased proportionally based on a flexible bandwidth allocation.

In some examples of the method, apparatuses, and/or non-transitory computer-readable medium described above, the narrowband resource allocation is based at least in part on a flexible bandwidth allocation, wherein the flexible bandwidth allocation may be adjusted based on transmit time and data rate. Additionally or alternatively, in some examples the flexible bandwidth allocation is based at least in part on a path loss between a base station and the UE.

In some examples of the method, apparatuses, and/or non-transitory computer-readable medium described above, the transmit time is inversely proportional to the flexible bandwidth allocation. Additionally or alternatively, in some examples modulating the outgoing message comprises modulating the outgoing message based on a channel condition of the UE.

Some examples of the method, apparatuses, and/or non-transitory computer-readable medium described above may further include exchanging data with a network based on machine type communication (MTC) procedures.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
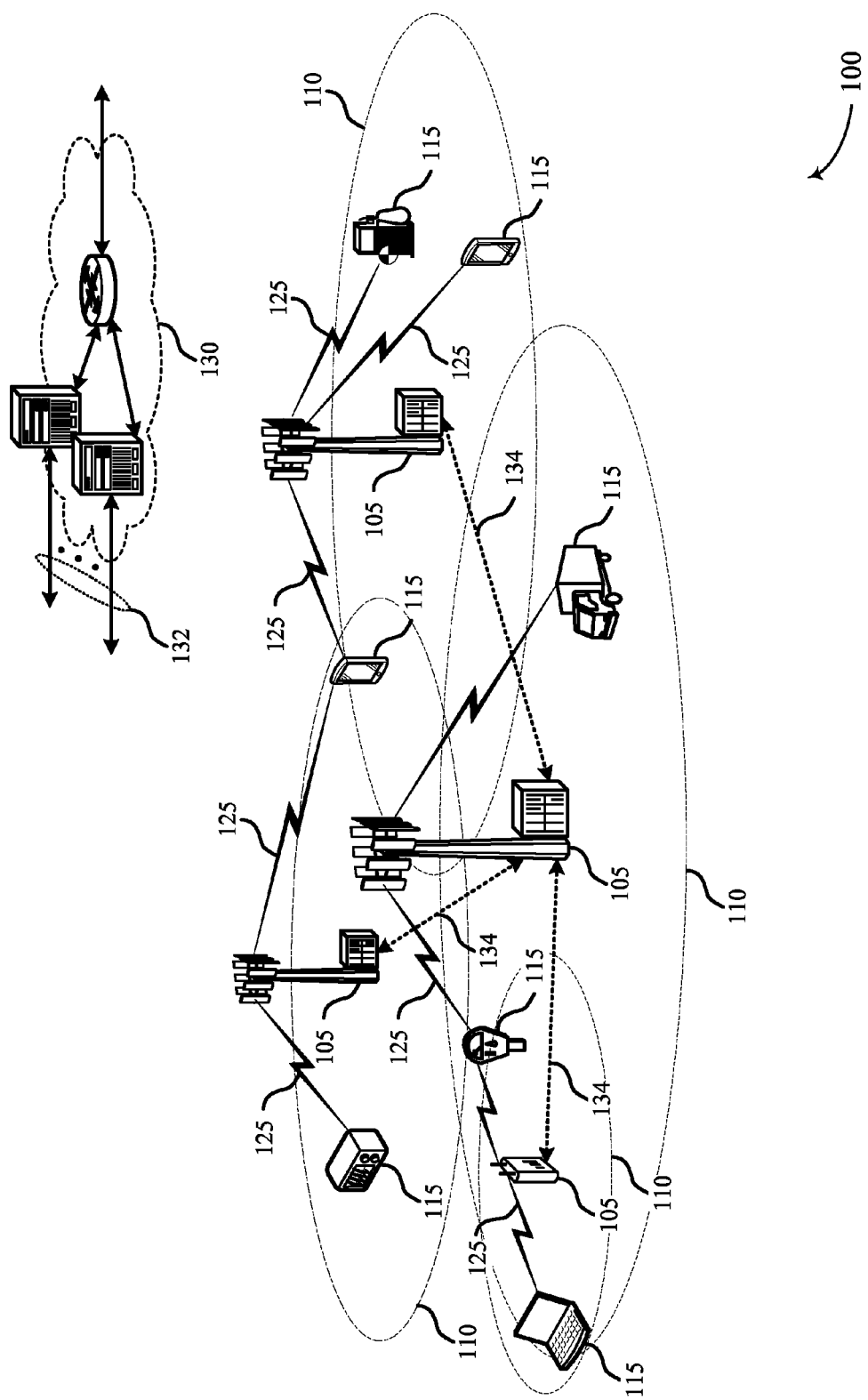
FIG. 1 illustrates an example of a wireless communications system for flexible GMSK in a cellular IoT system in accordance with various aspects of the present disclosure.

A network of automated devices which communicate wirelessly may, in some cases, be referred to as the internet of things (IoT). Devices which communicate over the IoT network (e.g., machine type communication (MTC) devices) may include automated meters, sensors, and the like. In some instances, the automated devices may have relatively low throughput applications (e.g., a water level sensor sending an update to a base station). There may be a number of wireless communication systems available for use by the automated devices, including cellular systems operating in licensed spectrum. However, cellular systems may be designed for devices which use high through-put applications. Devices that operate according to low throughput conditions (e.g., infrequent and small data transfers) may present design considerations different from those associated with higher through-put devices. For example, an automated device may be designed to operate for long periods of time without battery replacement.

In some cases, a cellular system may enhance power usage by using one modulation scheme in the downlink and a different modulation scheme in the uplink. For example, according to the present disclosure a wireless communication system may use OFDMA in the downlink and flexible narrowband GMSK in the uplink, which may enhance the peak-to-average power ration (PAPR). In the uplink, the narrowband GMSK may be configured such that the resources allocated to each device are flexible in time and frequency. For instance, an acutely power limited device may be allocated the smallest narrowband carrier available. On the other hand, if a device has less severe power limitations, the device may be allocated a narrowband carrier with bandwidth equal to a multiple of the smallest narrowband carrier. In such an instance, the symbol rate of the device may be increased by the same multiple as the bandwidth.

Accordingly, a device may use a proportionally wider baseband filter to process the wider allocated bandwidth (i.e., the filter bandwidth may be flexible in the digital domain). In some examples, the uplink modulation scheme may use the same bandwidth expansion factor (i.e., multiple) irrespective of the actual bandwidth allocated.

In other cases, communication between an IoT device and a base station may be enhanced by using open loop timing synchronization to determine transmit symbol time. As a result, uplink signals from different IoT devices communicating with a same base station in the IoT network may arrive within a window of time, the length of which may be up to the maximum round-trip delay between the IoT devices and the base station. To account for this, the length of a cyclic prefix used in an uplink transmission by an IoT device may be extended, while the length of a cyclic prefix used in a downlink transmission to the IoT device may remain shorter than the extended uplink cyclic prefix.

In some examples, a device may synchronize with a cell using a waveform known to the UE beforehand, and common to a group of cells in the local region. The device may then determine a physical broadcast channel (PBCH) time. The device may receive the PBCH and use it to determine a physical layer ID for the cell and a frequency for uplink transmissions. The PBCH may also indicate a channel configuration, which may enable the device to perform a random access procedure. The channel configuration may include a time and frequency resource configuration of a shared traffic channel. In some cases, the device may determine resources for data transmission based on an index of a control channel transmission. In some cases, there may be a predetermined delay between control channel transmissions and data channel transmissions. The device may then enter a low power state during the delay.

In another example, a base station may allocate, to a device, time and/or frequency resources for transmitting physical random access channel (PRACH) signals. In such instance, the resource allocation may be apportioned based on a type and class of PRACH signal. For example, a UE may be assigned a first subset of resources to transmit regularly scheduled traffic and a second subset of resources to transmit on-demand traffic. Regularly scheduled traffic may include, for example, sensor measurements reported to the base station on a predetermined time interval (e.g., 24 hour time interval). In contrast, an on-demand traffic may include an impromptu transmission, initiated based on a detection of at least one reporting trigger (e.g., sensing an abnormality at the device).

In some examples, a device may perform an initial access procedure to establish a connection with a serving cell. The device may then arrange a regular transmission schedule with the serving cell including a discontinuous transmission (DTX) cycle and an acknowledgement schedule. The device may enter a low power mode and refrain from any transmission during the a sleep interval of the DTX cycle. The device may then wake up and transmit a message to the serving cell after the sleep interval without performing an another access procedure. The device may perform another access procedure to transmit at times not covered by the regular transmission schedule. For example, if an acknowledgement (ACK) for the message isn't received, the device may perform another access procedure for retransmission.

In yet another example, an IoT device may use stored control information from a first communication session with the base station to determine the power and timing control information for a subsequent second communication session. Specifically, in this example, a device may establish a first communication session with the base station and receive, during the first communication session, closed loop control information from the base station to aid the device in adjusting transmit signal symbol timing and/or power control levels associated with an uplink transmission. In such instance, the device may store, in its memory, the transmit power and symbol timing information derived from the closed loop control information during the first communication session. Subsequently, the device may utilize the stored closed loop control information from the first communication session to determine the transmit signal power and/or symbol timing to establish a second communication session with the base station.

The following description provides examples of flexible GMSK in a cellular Internet of Things (IoT) system, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, at least one UE 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., 51, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

In the wireless communications system 100, some UEs may provide for automated communication. Automated wireless devices may include those implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. The UEs 115 in wireless communications system 100 that are M2M or MTC devices may also be part of an IoT. Thus, wireless communications system 100 may also include or be part of an IoT system.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

According to the present disclosure, a user equipment (UE) 115 may utilize orthogonal frequency division multiple access (OFDMA) for demodulating downlink messages and a combination of Gaussian minimum shift keying (GMSK) and single carrier frequency division multiple access (SC-FDMA) for uplink modulation. The uplink modulation process may include generating a symbol vector with an M-point discrete Fourier transform (DFT), filtering the symbol vector with a frequency domain Gaussian filter, generating a sample vector from the filtered symbol vector utilizing an inverse DFT, and modulating the sample vector utilizing GMSK. In some cases, the uplink modulation may be based on a narrowband resource allocation received from a base station 105.

Figure 2:
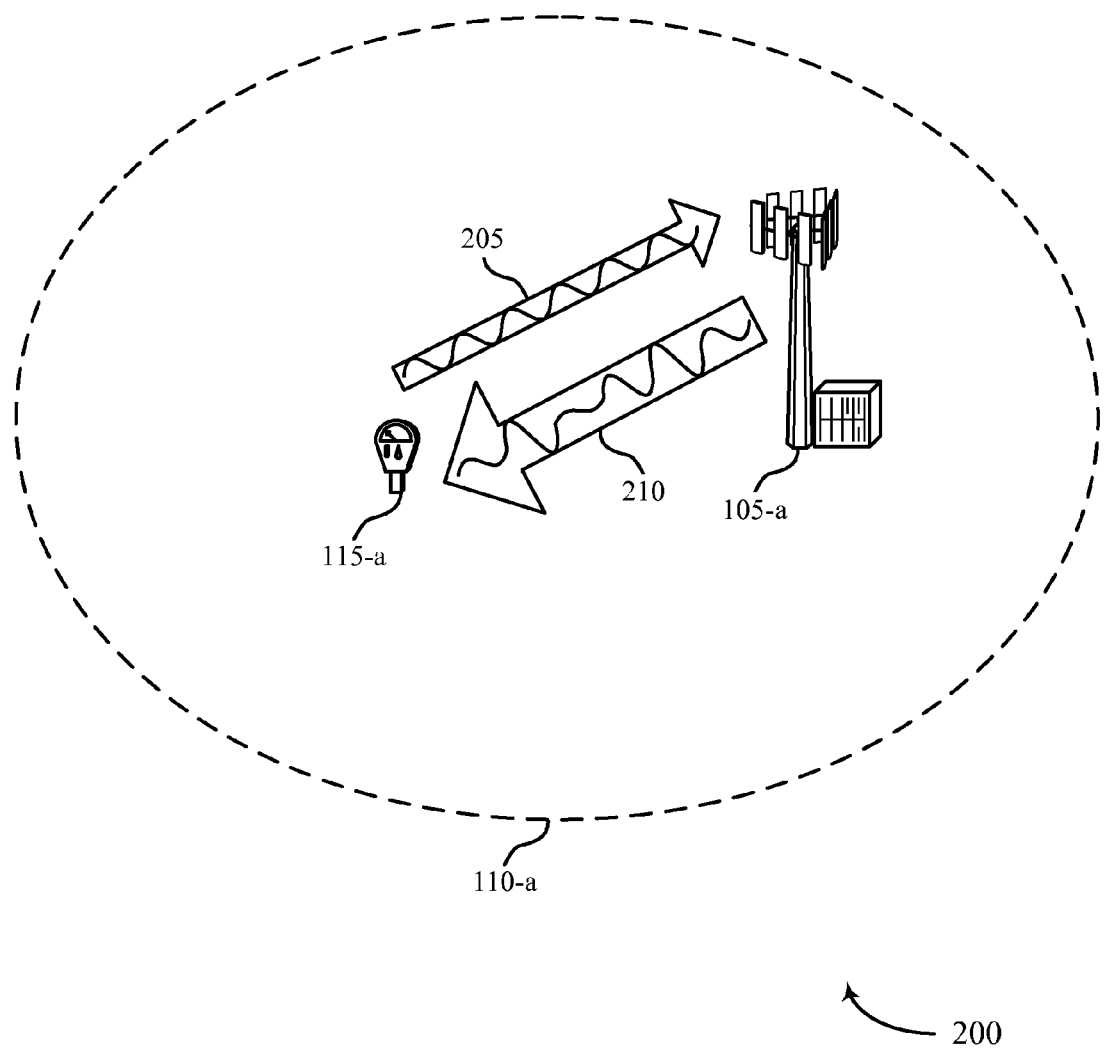
FIG. 2 illustrates an example of a wireless communications subsystem for flexible GMSK in a cellular IoT system in accordance with various aspects of the present disclosure.

FIG. 2 illustrates an example of a wireless communications subsystem 200 for flexible GMSK in a cellular IoT system in accordance with various aspects of the present disclosure. Wireless communications subsystem 200 may include a UE 115-*a*, which may be an example of a UE 115 described above with reference to FIG. 1. Wireless communications subsystem 200 may also include a base station 105-*a*, which may be an example of a base station 105 described above with reference to FIG. 1.

UE 115-*a* may communicate with base station 105-*a* via uplink 205 and downlink 210, as generally described above with respect to FIG. 1. Downlink 210 may comprise a signal with a modulation scheme which results in a relatively high peak-to-average-power-ratio (PAPR) (i.e., significantly greater than 1). Uplink 205 may use a modulation scheme which enables a relatively low PAPR of 1 or close to 1. For example, UE 115-*a* may utilize OFDMA for demodulating messages on downlink 210 and a combination of GMSK and SC-FDMA for uplink 205. The uplink 205 modulation process may include generating a symbol vector with an M-point DFT, filtering the symbol vector with a frequency domain Gaussian filter, generating a sample vector from the filtered symbol vector utilizing an inverse DFT, and modulating the sample vector utilizing GMSK. In some cases, the uplink 205 modulation may be based on a narrowband resource allocation received from a base station 105-*a*.

Figure 3:
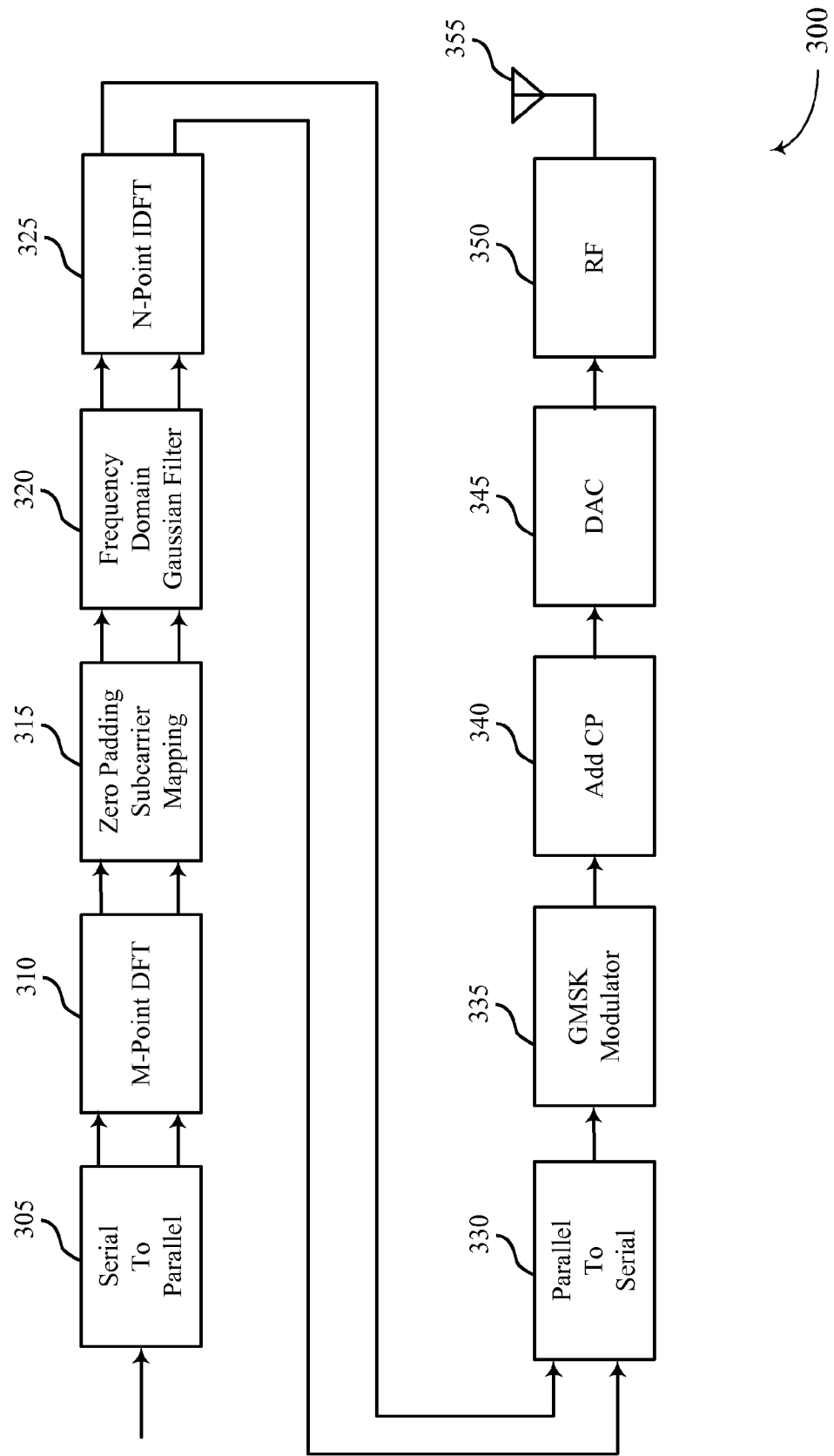
FIG. 3 illustrates an example of a transmit chain for flexible GMSK in a cellular IoT system in accordance with various aspects of the present disclosure.

FIG. 3 illustrates an example of a transmit chain 300 for flexible GMSK in a cellular IoT system in accordance with various aspects of the present disclosure. Transmit chain 300 may be implemented by a UE 115 as described above with reference to FIG. 1 or 2. For example, transmit chain 300 may be used by UE 115-*a* to transmit a constant PAPR signal over uplink 205 as described above with reference to FIG. 2.

At block 305, transmit chain 300 may convert a serial time domain signal to a plurality of parallel time domain signals. Transmit chain 300 may include an M-Point DFT at block 310, which may transform the parallel time domain signals into frequency domain signals using an N-point DFT (e.g., block 310 may output a vector of M complex symbols in the frequency domain). In some instances, at block 315 the parallel frequency domain signals may be zero padded to order to map the symbols onto a selected set of frequency resources.

At bock 320, a Gaussian filter may be applied to the signals. The Gaussian filter may be applied in order to ensure that the impulse response of the signal vector is a Gaussian function, which may enable subsequent GMSK modulation.

At block 325, an N-point inverse DFT (IDFT) may convert the frequency domain signal vector into the time domain using an N-point inverse Fourier transform. For example, block 325 may output a sample vector in the time domain. In some embodiments, the plurality of parallel time domain signals (i.e., the sample vector) may be converted into a single signal at block 330. In some cases, N may represent the total number of tones (or subcarriers) of the system and M may represent the number of tones allocated to the given MTC transmitter (i.e., the narrowband allocation). Thus, in general M may be less than N.

At block 335, a GMSK modulator may be used to modulate a signal. GMSK may be a continuous phase frequency-shift keying modulation scheme utilizing a signal described by the equation $$x(t) = \cos(2\pi f_c t + \Phi(t)), \quad (1)$$

with $$\Phi(t) = 2\pi h \int_{-\infty}^{t} \sum_{k=-\infty}^{\infty} a_k s(\tau - kt) d\tau, \quad (2)$$

where $f_c$ is the carrier frequency, $a_k$ is a binary index ±1, h is a modulation index (e.g., h=0.5), and s(t) is a Gaussian frequency shaping filter normalized such that $$\int_{-\infty}^{\infty} s(\tau) d\tau = \frac{1}{2}. \quad (3)$$

GMSK modulation may reduce sideband power, and may be insensitive to fading effects and power amplifier non-linearities. GMSK modulation may be a means of ensuring that the PAPR of the signal is equal. In some cases, the GMSK modulator may include a phase accumulator and an in-phase/quadrature (IQ) modulator as subcomponents.

At step 340, a cyclic prefix (CP) may be added to the signal to mitigate inter-symbol interference. The digital signal may then be converted into an analog signal at step 345 using, for example, a digital-to-analog converter (DAC). At step 350, the baseband signal may be up-converted to a radio-frequency (RF) for transmission via antenna 355.

Thus, a UE 115 may utilize OFDMA for demodulating downlink messages and a combination of GMSK and SC-FDMA for uplink modulation. The uplink modulation process may include use of one or more blocks of the transmit chain 300 described above, including generating a symbol vector with an M-point DFT (e.g., at block 310), filtering the symbol vector with a frequency domain Gaussian filter (e.g., at block 320), generating a sample vector from the filtered symbol vector utilizing an inverse DFT (e.g., at block 325), and modulating the sample vector utilizing GMSK (e.g., at block 335).

Figure 4:
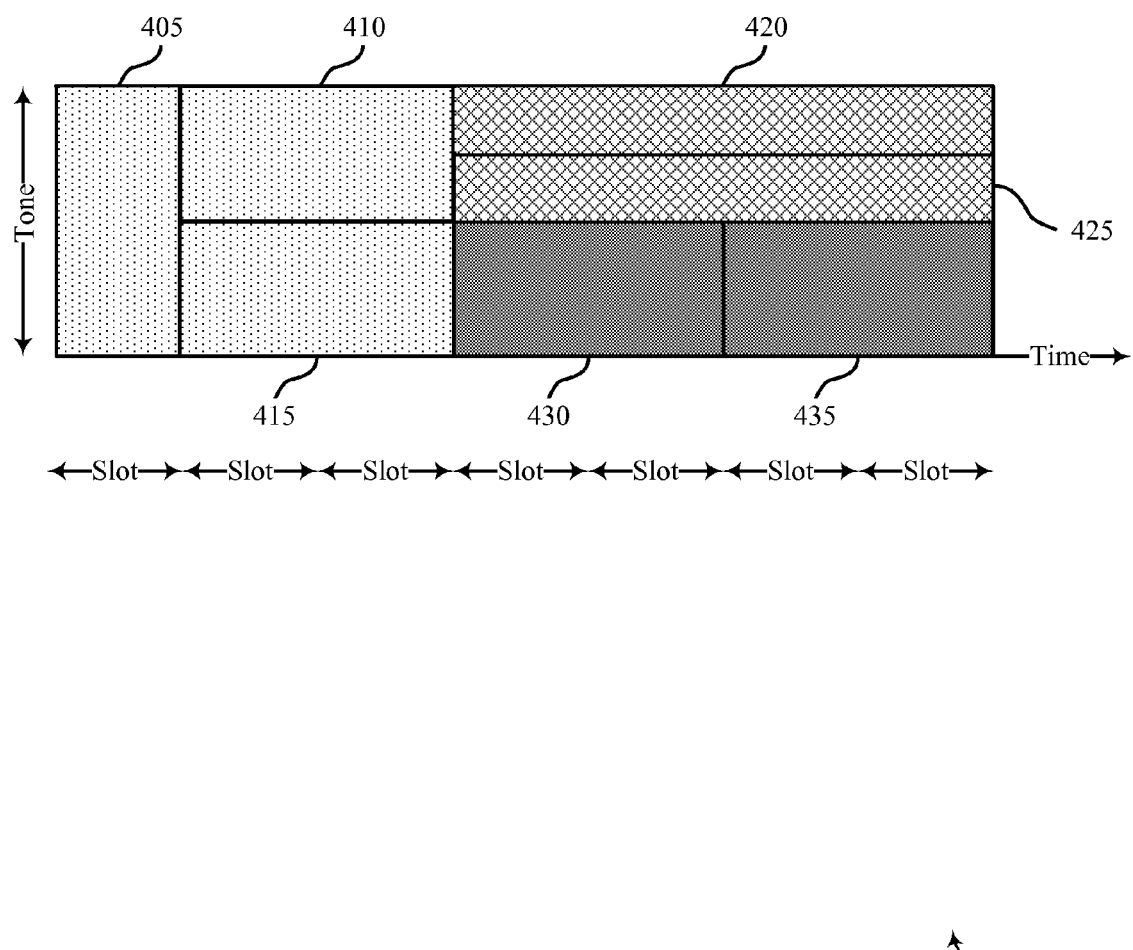
FIG. 4 illustrates an example of a resource allocation for flexible GMSK in a cellular IoT system in accordance with various aspects of the present disclosure.

FIG. 4 illustrates an example of a resource allocation 400 for flexible GMSK in a cellular IoT system in accordance with various aspects of the present disclosure. Resource allocation 400 depicts time-frequency resource segments which span a number of tones (i.e., frequency subcarriers). Resource allocation 400 may be provided by a base station 105 to a UE 115 as described above with reference to FIG. 1 or 2 and may be used in conjunction with a modulation scheme as described above with reference to FIG. 3. Resource allocation 400 depicts an illustrative example including four tones, but the number of tones available may be more than four. In some cases, the number of tones for flexible allocation may be equal to the number of subcarriers in the carrier (e.g., 1200 subcarriers for a 20 MHz carrier).

A segment may comprise all the tones available for allocation, (e.g., segment 405 or a portion of the available tones (e.g., segment 420 and segment 425). In some instances, (e.g., segment 420 and segment 425) may comprise the smallest narrowband carrier in terms of bandwidth (e.g., a 15 KHz subcarrier). Other resource segments (e.g., segments 410, 415, 430, and 435) may use an intermediate bandwidth. The number of slots used by a resource segment may be inversely proportional to the number of tones in the segment. For example, segment 405, which comprises four tones available for allocation, may use only one slot while segment 410, which comprises two tones available, may use twice as many time slots. Segment 420, which comprises only one tone, may use four-times as many slots. The time-frequency resources of resource allocation 400 may be assigned to the same UE 115 or different UEs 115, and may be dynamically and flexibly allocated. For example, segments 405, 410, and 415 may be allocated to one UE 115, segments 420 and 425 may be allocated to a second UE 115 and segments 430 and 435 may be allocated to a third UE 115. In some cases, the bandwidth of the segments assigned to a UE 115 may correspond to the power limitations of the device. For example, a power limited UE 115 may be allocated a wider bandwidth to enable the device to power down radio components during a longer sleep period.

Thus, flexible bandwidth allocation may reduce power consumption, thereby conserving power for a power-limited UE 115. In this and other examples, segments may be allocated resources which are multiples of the smallest narrowband carrier. For instance, segment 410, 415, 430, 435 may have twice the bandwidth of the smallest narrowband carrier. In other cases, the multiple may be an integer other than two. The symbol rate of a UE 115 may in effect be increased by the same multiple (i.e., the number of symbols transmitted during a slot may be proportional to the number of tones used to transmit).

Figure 5:
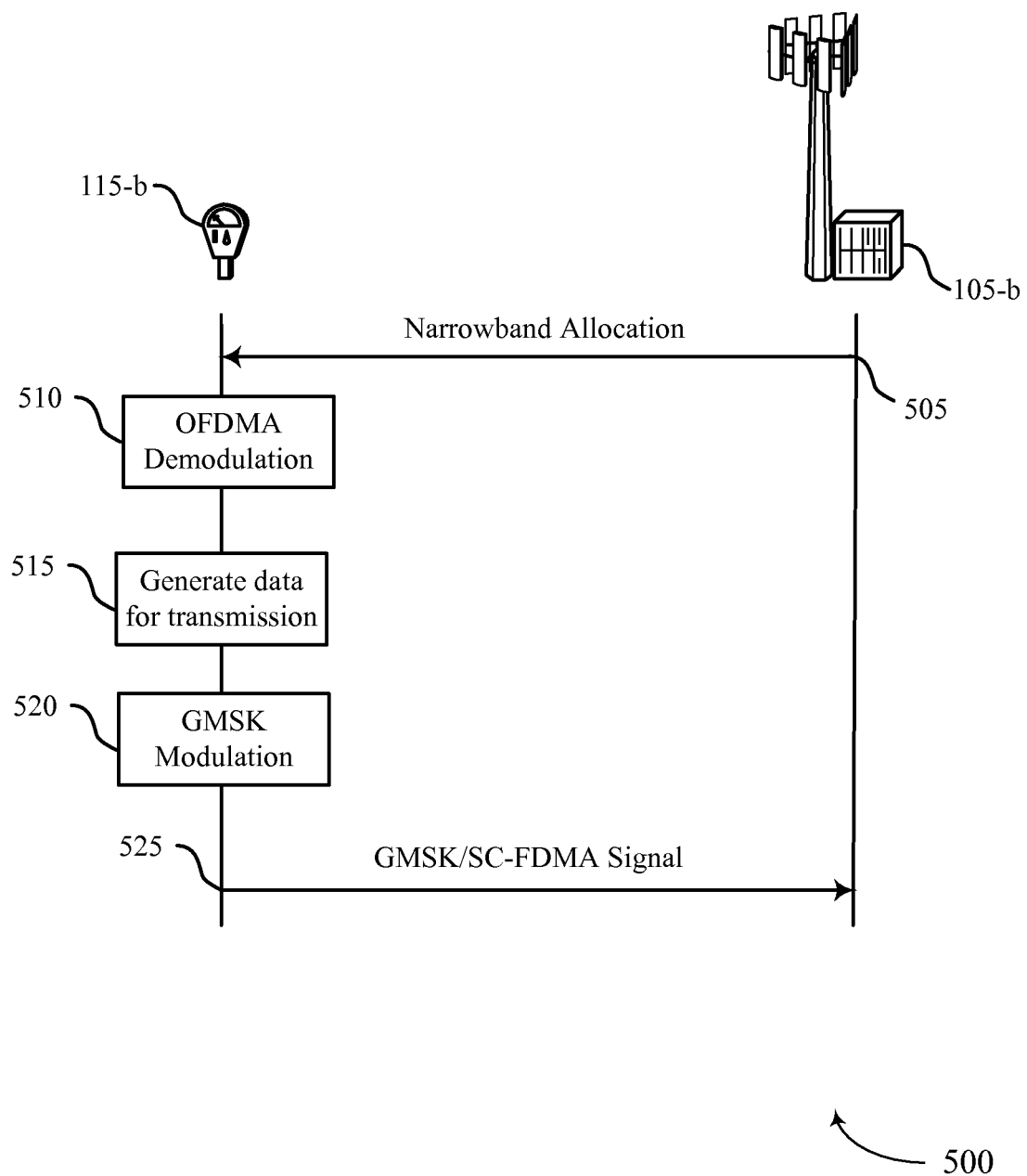
FIG. 5 illustrates an example of a process flow for flexible GMSK in a cellular IoT system in accordance with various aspects of the present disclosure.

FIG. 5 illustrates an example of a process flow 500 for flexible GMSK in a cellular IoT system in accordance with various aspects of the present disclosure. Process flow 500 may include a UE 115-b, which may be an example of a UE 115 described above with reference to FIG. 1 or 2. Process flow 500 may also include a base station 105-b, which may be an example of a base station 105 described above with reference to FIGS. 1-2.

At step 505, UE 115-b may receive a narrowband resource allocation on a downlink connection from base station 105-b. In some examples the narrowband resource allocation is based on a power limitation of UE 115-b. For example, base station 105-b may receive an indication of a power limitation from UE 115-b. In other examples, the flexible bandwidth allocation is based on a path loss between a base station and UE 115-b. The transmit time and data rate of the bandwidth allocation may be dynamically adjusted. In these or other embodiments, a bandwidth of the narrowband resource allocation may be a multiple of a smallest narrowband carrier bandwidth. For example, the bandwidth may be a multiple of 15 Khz in an LTE compatible system.

At step 510, UE 115-b may demodulate the narrowband resource allocation or another incoming message utilizing orthogonal frequency division multiple access (OFDMA) demodulation. In some cases, the incoming message may have a relatively high PAPR as described above with reference to FIG. 2.

At step 515, UE 115-b may generate data for transmission (i.e., an outgoing message). For example, UE 115-b may generate a control message (such as an ACK for the incoming message) or user data from a higher layer application.

At step 520, UE 115-b may modulate the data utilizing GMSK and SC-FDMA modulation. For example, modulating the data may include generating a symbol vector with an M-point DFT, filtering the symbol vector with a frequency domain Gaussian filter, generating a sample vector from the filtered symbol vector using an inverse DFT, and modulating data using GMSK modulation. In some cases, the GMSK modulation may depend on the channel conditions. The filter bandwidth may be flexibly increased or decreased proportional to the transmission bandwidth.

At step 525, UE 115-b may transmit the data using the narrowband resource allocation. In some examples the transmit time is inversely proportional to the bandwidth. In some cases, UE 115-b may exchange data with a network based on MTC procedures.

Figure 6:
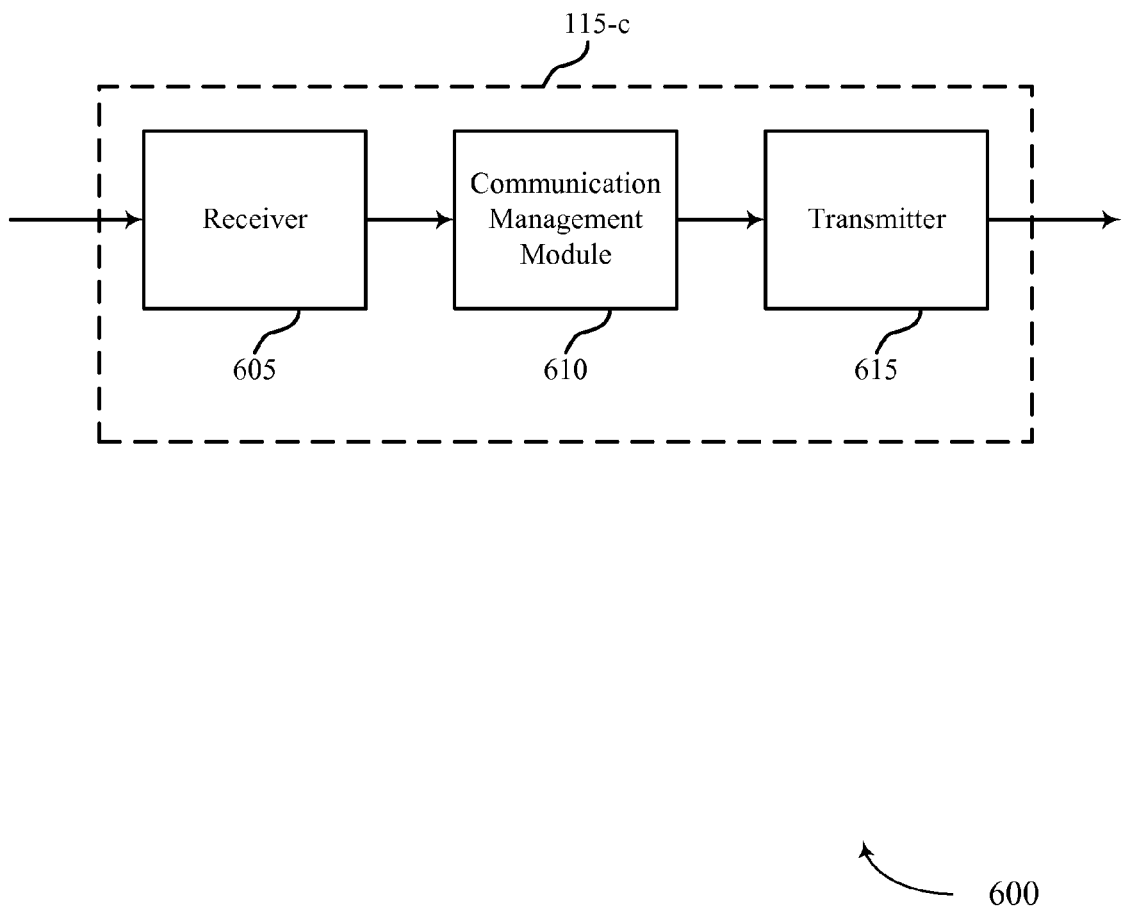
FIG. 6 shows a block diagram of a user equipment (UE) configured for flexible GMSK in a cellular IoT system in accordance with various aspects of the present disclosure.

FIG. 6 shows a block diagram 600 of a UE 115-c configured for flexible GMSK in a cellular IoT system in accordance with various aspects of the present disclosure. UE 115-c may be an example of aspects of a UE 115 described with reference to FIGS. 1-5. UE 115-c may include a receiver 605, a communication management module 610, and/or a transmitter 615. UE 115-c may also include a processor. Each of these components may be in communication with each other.

The receiver 605 may receive information such as packets, user data, and/or control information associated with various information channels (e.g., control channels, data channels, and information related to flexible GMSK in a cellular IoT system, etc.). Information may be passed on to the communication management module 610, and to other components of UE 115-c.

The communication management module 610 may receive a narrowband resource allocation from a base station, modulate an outgoing message utilizing GMSK and SC-FDMA modulation, and transmit the outgoing message using the narrowband resource allocation.

The transmitter 615 may transmit signals received from other components of UE 115-c. In some embodiments, the transmitter 615 may be collocated with the receiver 605 in a transceiver module. The transmitter 615 may include a single antenna, or it may include a plurality of antennas. In some examples, the transmitter 615 may transmit outgoing messages using a narrowband resource allocation received from a base station 105 using the receiver 605.

Figure 7:
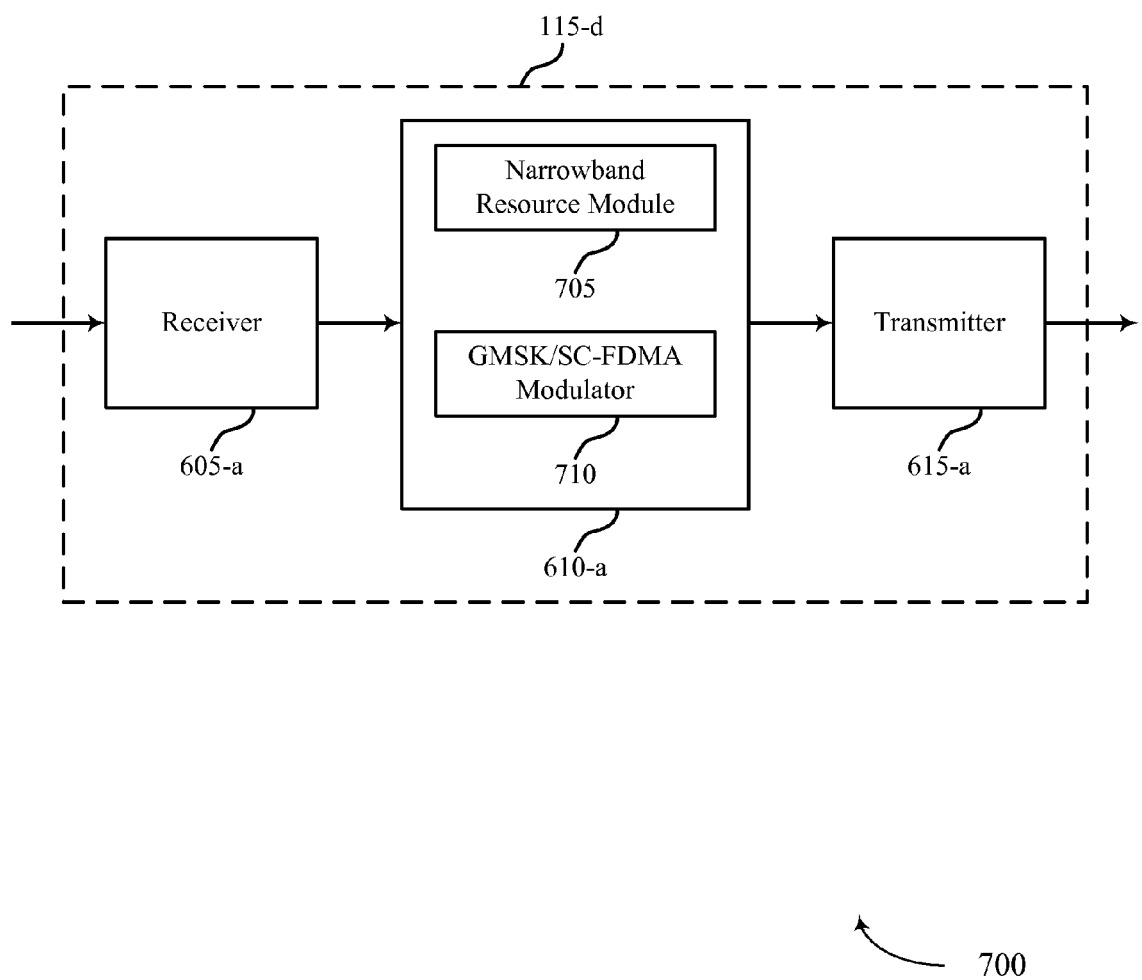
FIG. 7 shows a block diagram of a UE configured for flexible GMSK in a cellular IoT system in accordance with various aspects of the present disclosure.

FIG. 7 shows a block diagram 700 of a UE 115-d for flexible GMSK in a cellular IoT system in accordance with various aspects of the present disclosure. UE 115-d may be an example of aspects of a UE 115 described with reference to FIGS. 1-6. UE 115-d may include a receiver 605-a, a communication management module 610-a, and/or a transmitter 615-a. UE 115-d may also include a processor. Each of these components may be in communication with each other. The communication management module 610-a may also include a narrowband resource module 705, and a GMSK/SC-FDMA modulator 710.

The receiver 605-a may receive information which may be passed on to communication management module 610-a, and to other components of UE 115-d. The communication management module 610-a may perform the operations described above with reference to FIG. 6. The transmitter 615-a may transmit signals received from other components of UE 115-d.

The narrowband resource module 705 may receive a narrowband resource allocation from a base station as described above with reference to FIGS. 2-5. In some examples, the narrowband resource allocation may be based on a power limitation of UE 115-d. In some examples, a bandwidth of the narrowband resource allocation may be a multiple of a smallest narrowband carrier bandwidth. In some examples, the narrowband resource allocation may be based at least in part on a flexible bandwidth allocation, wherein the flexible bandwidth allocation may be adjusted based on transmit time and data rate. In some examples, the flexible bandwidth allocation may be based at least in part on a path loss between a base station 105 and UE 115-d. In some examples, the transmit time may be inversely proportional to the flexible bandwidth allocation.

The GMSK/SC-FDMA modulator 710 may modulate an outgoing message utilizing GMSK and SC-FDMA modulation as described above with reference to FIGS. 2-5. In some examples, modulating the outgoing message comprises modulating the outgoing message based on a channel condition of UE 115-d.

Figure 8:
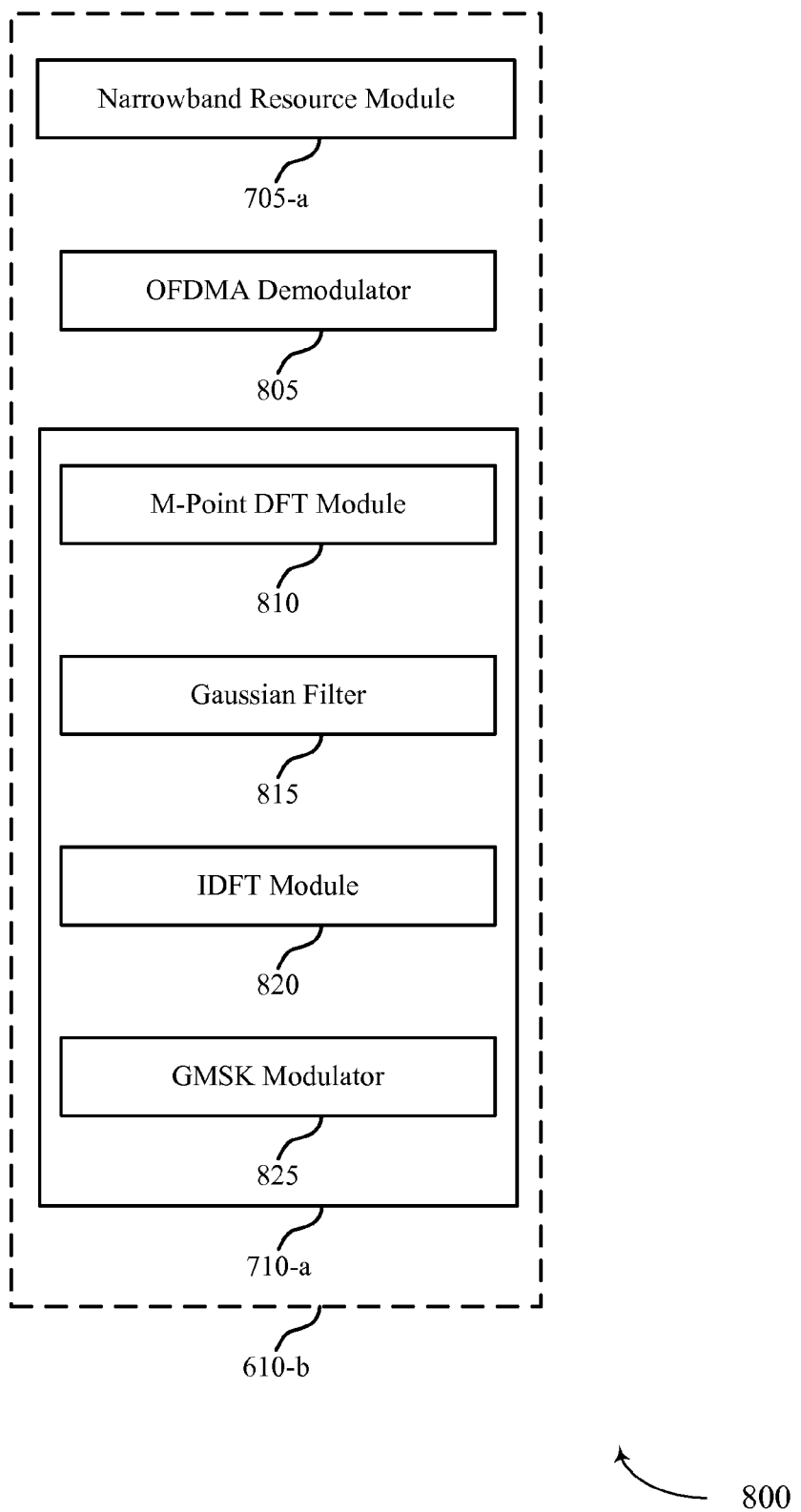
FIG. 8 shows a block diagram of a communication management module configured for flexible GMSK in a cellular IoT system in accordance with various aspects of the present disclosure.

FIG. 8 shows a block diagram 800 of a communication management module 610-b for flexible GMSK in a cellular IoT system in accordance with various aspects of the present disclosure. The communication management module 610-b may be an example of aspects of a communication management module 610 described with reference to FIG. 6 or 7. The communication management module 610-b may include a narrowband resource module 705-a, and a GMSK/SC-FDMA modulator 710-a. Each of these modules may perform the functions described above with reference to FIG. 7. The communication management module 610-b may also include an OFDMA demodulator 805. The GMSK/SC-FDMA modulator 710-a may include an M-Point DFT module 810, a Gaussian filter 815, an IDFT module 820, and a GMSK modulator 825.

The OFDMA demodulator 805 may demodulate an incoming message utilizing OFDMA modulation as described above with reference to FIGS. 2-5.

The M-Point DFT module 810 may generate a symbol vector with an M-point DFT as described above with reference to FIGS. 2-5. The Gaussian filter 815 may filter the symbol vector with a frequency domain Gaussian filter as described above with reference to FIGS. 2-5. The Gaussian filter 815 may filter the outgoing message based on a filter bandwidth that is flexible in the digital domain. In some examples, the filter bandwidth may be increased proportionally based on a flexible bandwidth allocation.

The IDFT module 820 may generate a sample vector from the filtered symbol vector utilizing an inverse DFT as described above with reference to FIGS. 2-5.

The GMSK modulator 825 may modulate the sample vector utilizing GMSK as described above with reference to FIGS. 2-5. In some cases, the GMSK modulator 825 may include a phase accumulator and an IQ modulator (not shown).

Figure 9:
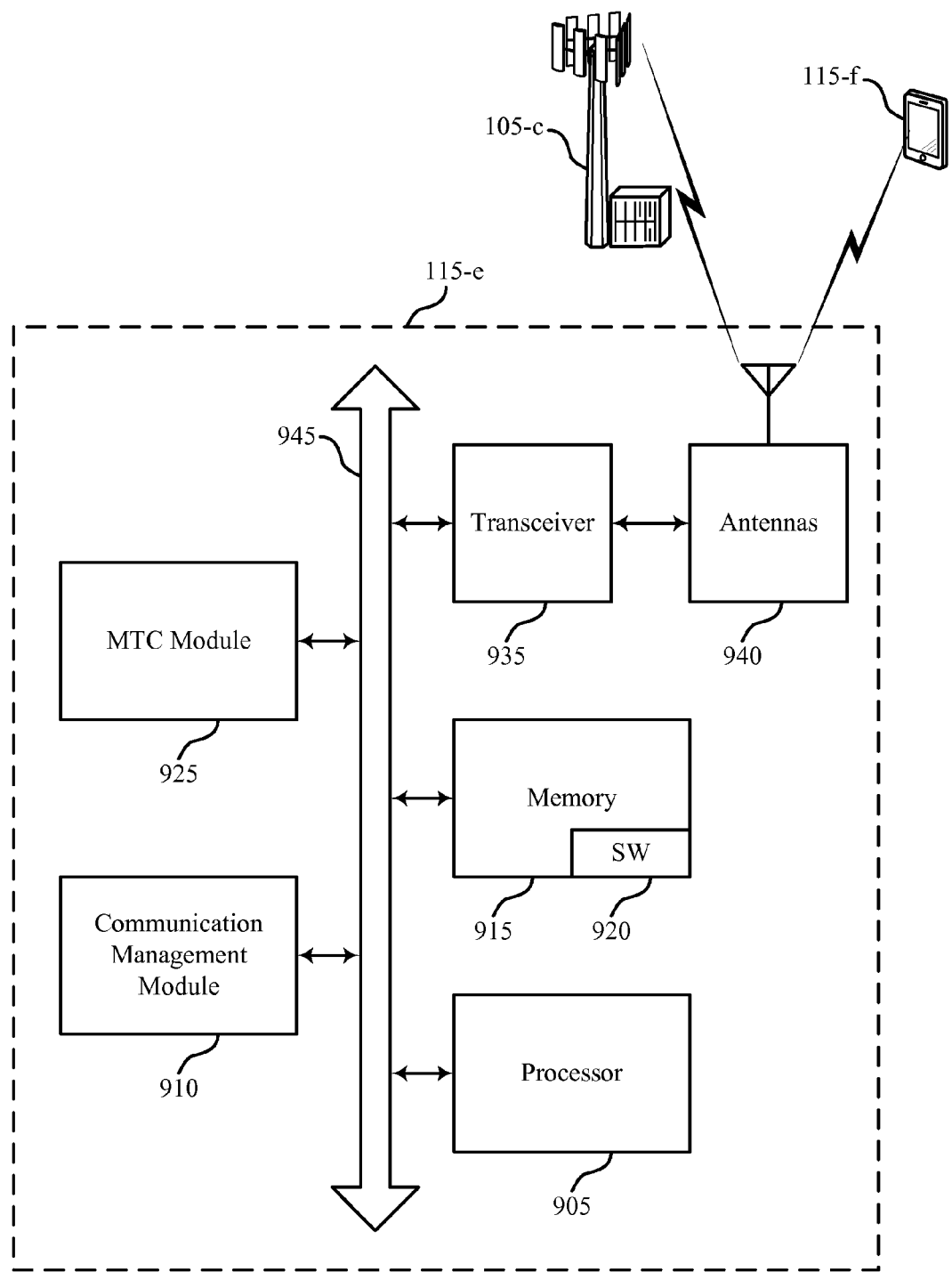
FIG. 9 illustrates a block diagram of a system including a UE configured for flexible GMSK in a cellular IoT system in accordance with various aspects of the present disclosure.

FIG. 9 shows a diagram of a system 900 including a UE 115 configured for flexible GMSK in a cellular IoT system in accordance with various aspects of the present disclosure. System 900 may include UE 115-e, which may be an example of a UE 115 described above with reference to FIGS. 1-8. UE 115-e may include a communication management module 910, which may be an example of a communication management module 610 described with reference to FIGS. 6-8. UE 115-e may also include an MTC module 925. UE 115-e may also include components for bi-directional voice and data communications including components for transmitting communications and components for receiving communications. For example, UE 115-e may communicate bi-directionally with UE 115-f and/or base station 105-c.

The MTC module 925 may exchange data with a network based on MTC procedures as described above with reference to FIGS. 2-5. For example, the MTC module 925 may facilitate improved communication between the UE 115-e and a base station 105-c by using open loop timing synchronization to determine transmit symbol time. In this example, the MTC module 925 may also facilitate the use of an extended cyclic prefix length in uplink transmissions, while non-extended cyclic prefix lengths may be used with downlink transmissions. By using extended uplink cyclic prefixes, uplink signals from different UEs (e.g., UE 115-e, 115-f) may arrive at a base station 105-c within a window of time (e.g., the maximum round-trip delay between the UEs 115-e, 115-f and the base station 105-c) covered by the uplink cyclic prefix.

In other examples of MTC procedures, UE 115-e may synchronize with a cell using a waveform known to the UE beforehand, and common to a group of cells in the local region. The UE may then determine a physical broadcast channel (PBCH) time. UE 115-e may receive the PBCH and use it to determine a physical layer ID for the cell and a frequency for uplink transmissions. The PBCH may also indicate a channel configuration, which may enable UE 115-e to perform a random access procedure. The channel configuration may include a time and frequency resource configuration of a shared traffic channel. In some cases, UE 115-e may determine resources for data transmission based on an index of a control channel transmission. In some cases, there may be a predetermined delay between control channel transmissions and data channel transmissions. UE 115-e may then enter a low power state during the delay.

In other examples of MTC procedures, the MTC module 925 may be configured to identify time and/or frequency resources allocated to UE 115-e by base station 105-c. In this example, the resource allocation may be apportioned based on a type and class of PRACH signal scheduled for transmission. For instance, the MTC module 925 may determine that UE 115-e is assigned a first subset of resources to transmit regularly scheduled traffic and a second subset of resources to transmit on-demand traffic. Regularly scheduled traffic may include, for example, sensor measurements reported to the base station on a predetermined time interval (e.g., 24 hour time interval). In contrast, an on-demand traffic may include an impromptu transmission, initiated based on a detection of at least one reporting trigger (e.g., sensing an abnormality at UE 115-e).

In other examples of MTC procedures, UE 115-e may perform an initial access procedure to establish a connection with a serving cell. UE 115-e may then arrange a regular transmission schedule with the serving cell including a discontinuous transmission (DTX) cycle and an acknowledgement schedule. UE 115-e may enter a low power mode and refrain from any transmission during the a sleep interval of the DTX cycle. UE 115-e may then wake up and transmit a message to the serving cell after the sleep interval without performing an another access procedure. UE 115-e may perform another access procedure to transmit at times not covered by the regular transmission schedule. For example, if an acknowledgement (ACK) for the message isn't received, UE 115-e may perform another access procedure for retransmission.

In other examples of MTC procedures, the MTC module 925 may facilitate using stored control information from a first communication session with the base station to determine the power and timing control information for a subsequent second communication session. Specifically, in this example, the MTC module 925 may establish a first communication session with the base station 105-c and receive, during the first communication session, closed loop control information from the base station 105-c to aid the UE 115-e in adjusting transmit signal symbol timing and/or power control levels associated with an uplink transmission. In such instance, the MTC module 925 may facilitate storing, in the memory 915, the transmit power and symbol timing information derived from the closed loop control information during the first communication session. Subsequently, the MTC module 925 may utilize the stored closed loop control information from the first communication session to determine the transmit signal power and/or symbol timing to establish a second communication session with the base station 105-c.

UE 115-e may also include a processor module 905, and memory 915 (including software (SW)) 920, a transceiver module 935, and one or more antenna(s) 940, each of which may communicate, directly or indirectly, with each other (e.g., via buses 945). The transceiver module 935 may communicate bi-directionally, via the antenna(s) 940 and/or wired or wireless links, with one or more networks, as described above. For example, the transceiver module 935 may communicate bi-directionally with a base station 105 and/or another UE 115. The transceiver module 935 may include a modem to modulate the packets and provide the modulated packets to the antenna(s) 940 for transmission, and to demodulate packets received from the antenna(s) 940. While UE 115-e may include a single antenna 940, UE 115-e may also have multiple antennas 940 capable of concurrently transmitting and/or receiving multiple wireless transmissions.

The memory 915 may include random access memory (RAM) and read only memory (ROM). The memory 915 may store computer-readable, computer-executable software/firmware code 920 including instructions that, when executed, cause the processor module 905 to perform various functions described herein (e.g., flexible GMSK in a cellular IoT system, etc.). Alternatively, the software/firmware code 920 may not be directly executable by the processor module 905 but cause a computer (e.g., when compiled and executed) to perform functions described herein. The processor module 905 may include an intelligent hardware device, (e.g., a central processing unit (CPU) such as an ARMO based processor or those made by Intel® Corporation or AMD®, a microcontroller, an ASIC, etc.)

Figure 10:
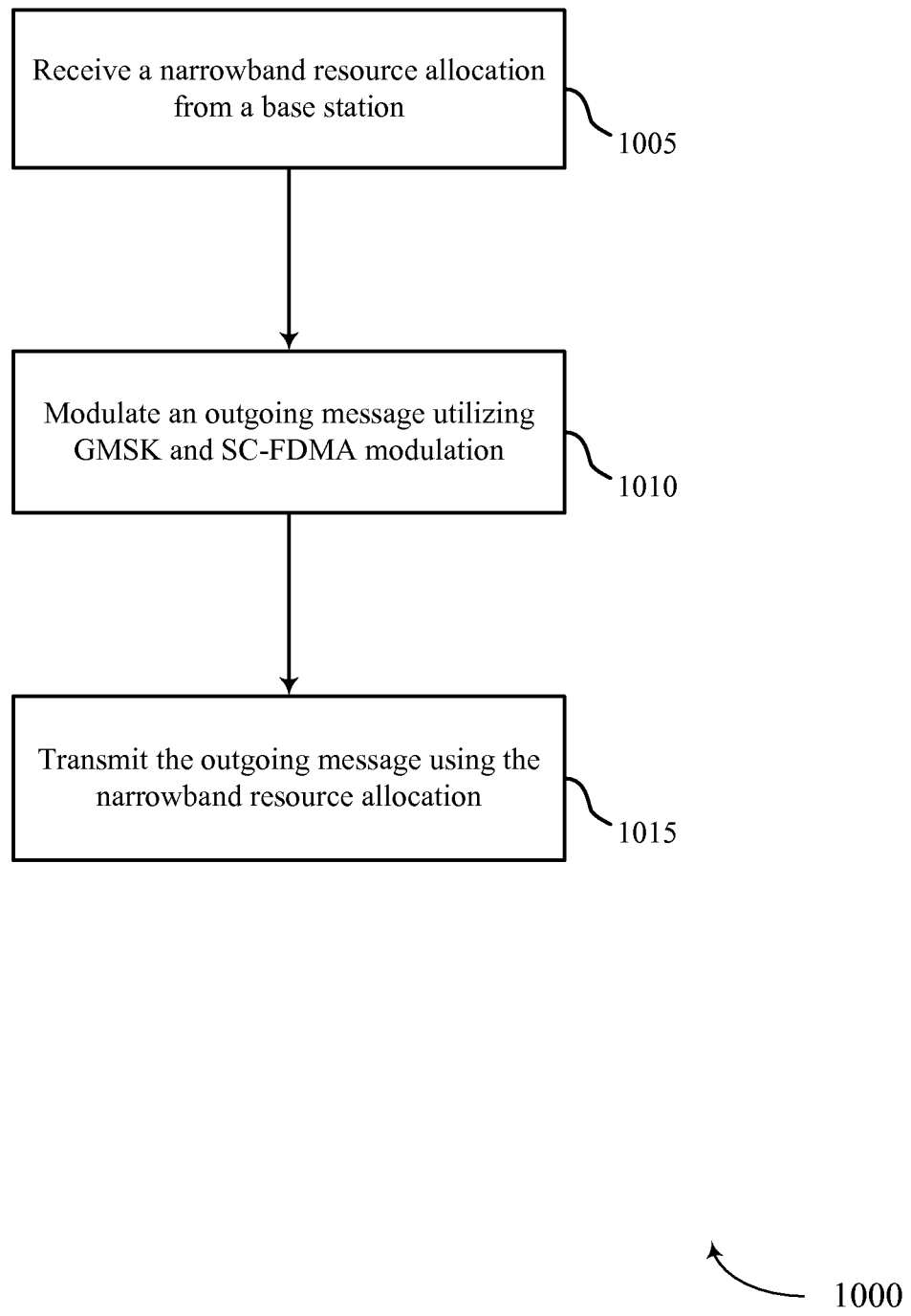
FIG. 10 shows a flowchart illustrating a method for flexible GMSK in a cellular IoT system in accordance with various aspects of the present disclosure.

FIG. 10 shows a flowchart illustrating a method 1000 for flexible GMSK in a cellular IoT system in accordance with various aspects of the present disclosure. The operations of method 1000 may be implemented by a UE 115 or its components as described with reference to FIGS. 1-9. For example, the operations of method 1000 may be performed by the communication management module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware.

At block 1005, the UE 115 may receive a narrowband resource allocation from a base station as described above with reference to FIGS. 2-5. In certain examples, the operations of block 1005 may be performed by the narrowband resource module 705 as described above with reference to FIG. 7.

At block 1010, the UE 115 may modulate an outgoing message utilizing GMSK and SC-FDMA modulation as described above with reference to FIGS. 2-5. In certain examples, the operations of block 1010 may be performed by the GMSK/SC-FDMA modulator 710 as described above with reference to FIG. 7.

At block 1015, the UE 115 may transmit the outgoing message using the narrowband resource allocation as described above with reference to FIGS. 2-5. In certain examples, the operations of block 1015 may be performed by the transmitter 615 as described above with reference to FIG. 6.

Figure 11:
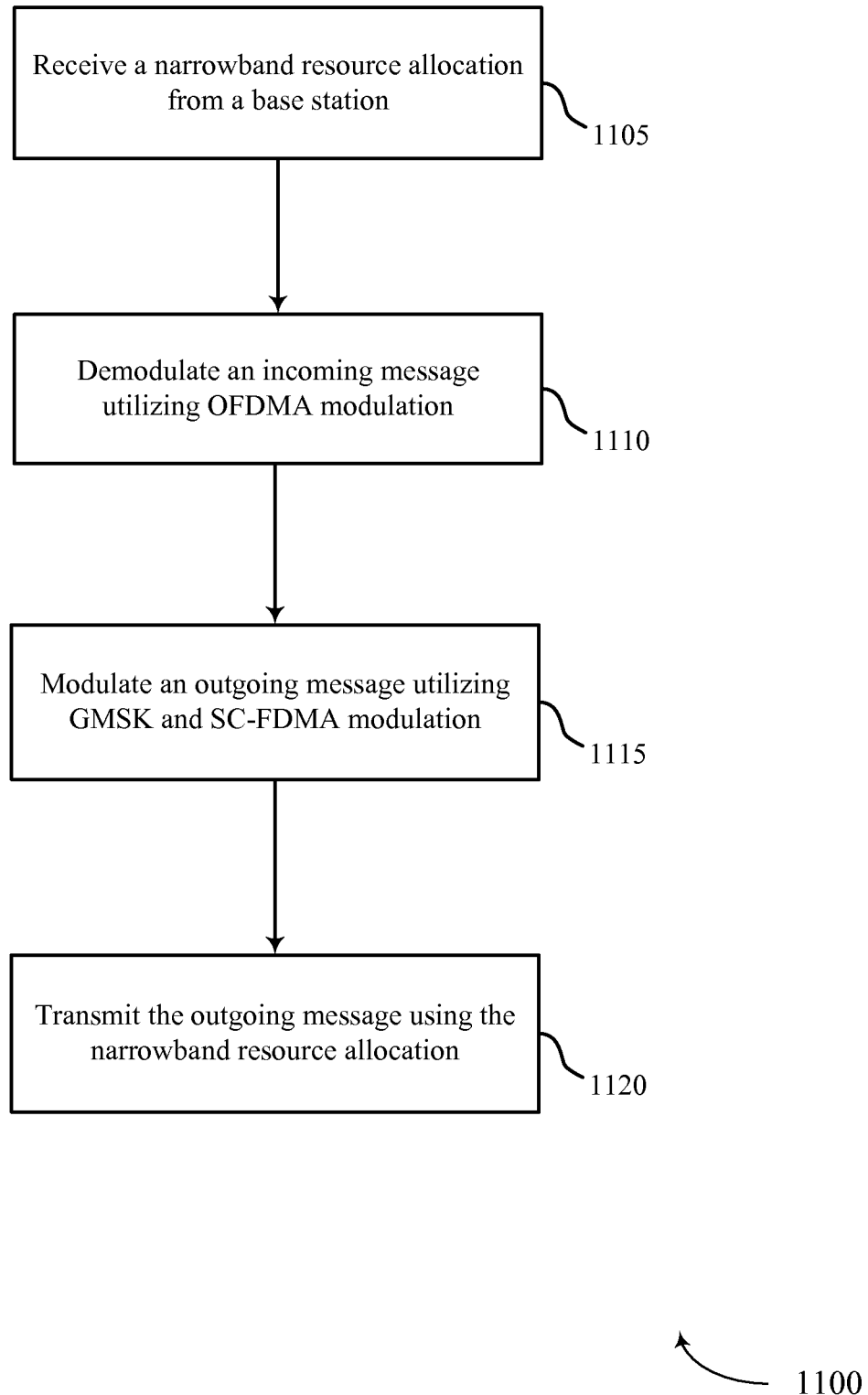
FIG. 11 shows a flowchart illustrating a method for flexible GMSK in a cellular IoT system in accordance with various aspects of the present disclosure.

FIG. 11 shows a flowchart illustrating a method 1100 for flexible GMSK in a cellular IoT system in accordance with various aspects of the present disclosure. The operations of method 1100 may be implemented by a UE 115 or its components as described with reference to FIGS. 1-9. For example, the operations of method 1100 may be performed by the communication management module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1100 may also incorporate aspects of method 1000 of FIG. 10.

At block 1105, the UE 115 may receive a narrowband resource allocation from a base station as described above with reference to FIGS. 2-5. In certain examples, the operations of block 1105 may be performed by the narrowband resource module 705 as described above with reference to FIG. 7.

At block 1110, the UE 115 may demodulate an incoming message utilizing OFDMA modulation as described above with reference to FIGS. 2-5. For example, the UE 115 may demodulate the narrowband resource allocation. In certain examples, the operations of block 1120 may be performed by the OFDMA demodulator 805 as described above with reference to FIG. 8.

At block 1115, the UE 115 may modulate an outgoing message utilizing GMSK and SC-FDMA modulation as described above with reference to FIGS. 2-5. In certain examples, the operations of block 1110 may be performed by the GMSK/SC-FDMA modulator 710 as described above with reference to FIG. 7.

At block 1120, the UE 115 may transmit the outgoing message using the narrowband resource allocation as described above with reference to FIGS. 2-5. In certain examples, the operations of block 1115 may be performed by the transmitter 615 as described above with reference to FIG. 6.

Figure 12:
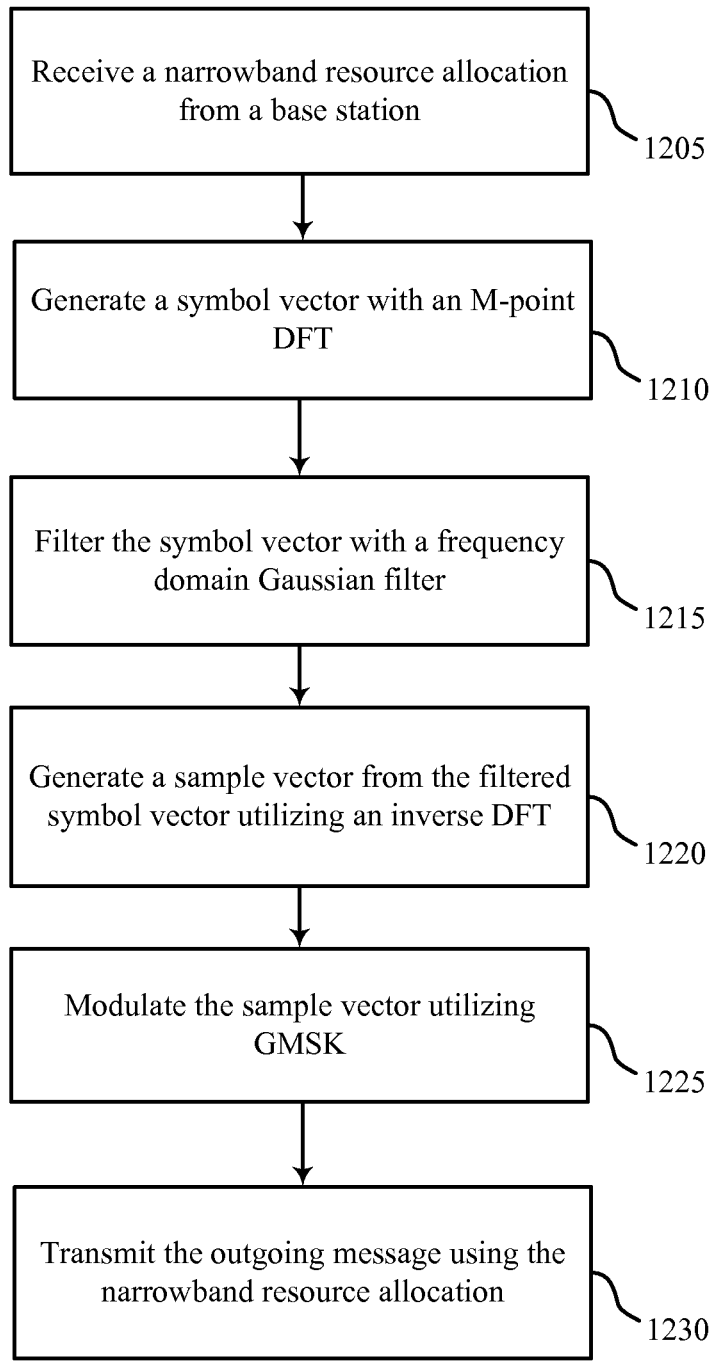
FIG. 12 shows a flowchart illustrating a method for flexible GMSK in a cellular IoT system in accordance with various aspects of the present disclosure.

FIG. 12 shows a flowchart illustrating a method 1200 for flexible GMSK in a cellular IoT system in accordance with various aspects of the present disclosure. The operations of method 1200 may be implemented by a UE 115 or its components as described with reference to FIGS. 1-9. For example, the operations of method 1200 may be performed by the communication management module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1200 may also incorporate aspects of methods 1000, and 1100 of FIG. 10 or 11.

At block 1205, the UE 115 may receive a narrowband resource allocation from a base station as described above with reference to FIGS. 2-5. In certain examples, the operations of block 1205 may be performed by the narrowband resource module 705 as described above with reference to FIG. 7.

The UE 115 may then modulate an outgoing message. For example, at block 1210, the UE 115 may generate a symbol vector with an M-point DFT as described above with reference to FIGS. 2-5. In certain examples, the operations of block 1210 may be performed by the M-Point DFT module 810 as described above with reference to FIG. 8.

At block 1215, the UE 115 may filter the symbol vector with a frequency domain Gaussian filter as described above with reference to FIGS. 2-5. In certain examples, the operations of block 1215 may be performed by the Gaussian filter 815 as described above with reference to FIG. 8.

At block 1220, the UE 115 may generate a sample vector from the filtered symbol vector utilizing an inverse DFT as described above with reference to FIGS. 2-5. In certain examples, the operations of block 1220 may be performed by the IDFT module 820 as described above with reference to FIG. 8.

At block 1225, the UE 115 may modulate the sample vector utilizing GMSK as described above with reference to FIGS. 2-5. In certain examples, the operations of block 1225 may be performed by the GMSK modulator 825 as described above with reference to FIG. 8.

At block 1230, the UE 115 may transmit the outgoing message using the narrowband resource allocation as described above with reference to FIGS. 2-5. In certain examples, the operations of block 1230 may be performed by the transmitter 615 as described above with reference to FIG. 6.

Figure 13:
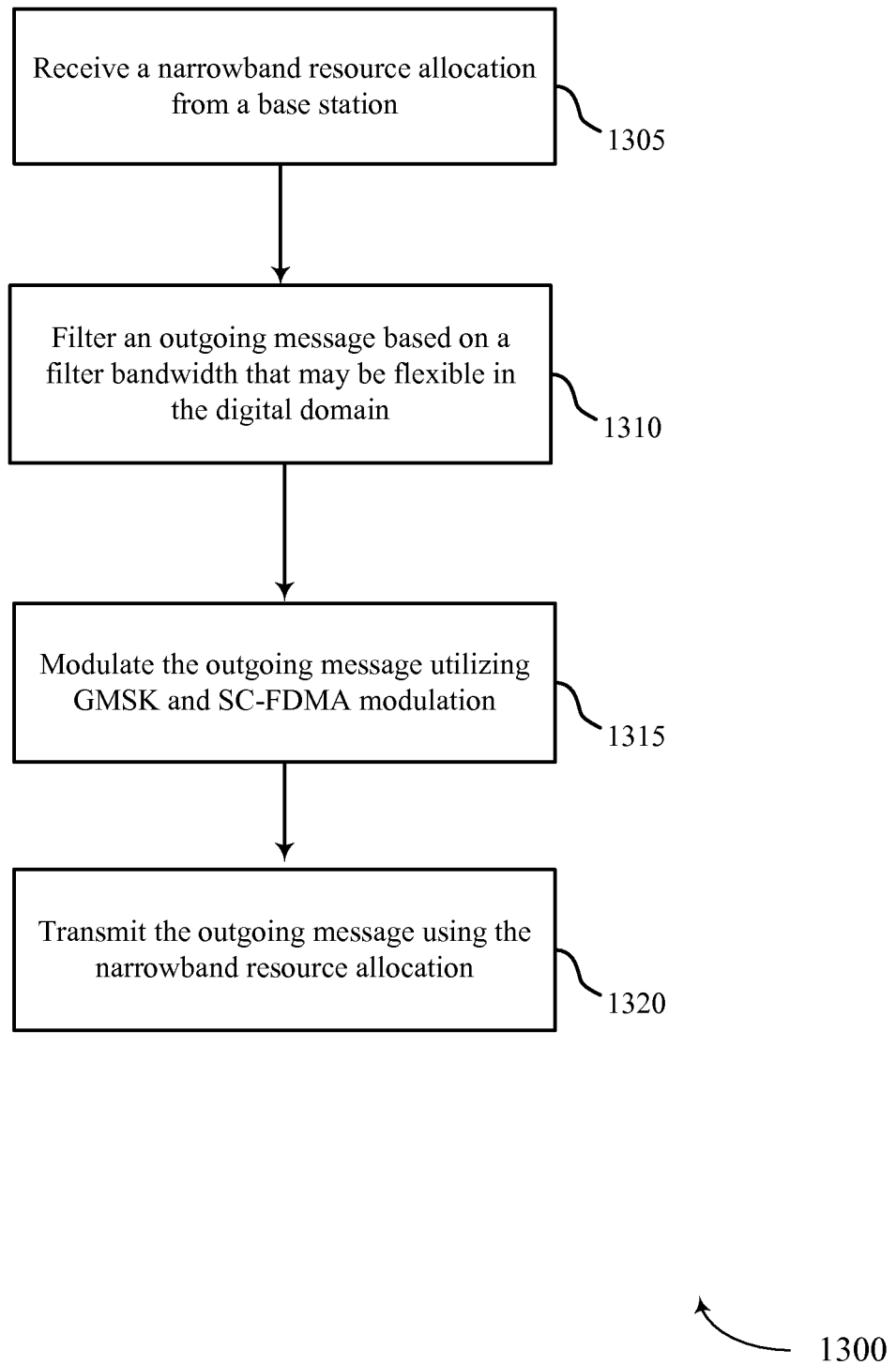
FIG. 13 shows a flowchart illustrating a method for flexible GMSK in a cellular IoT system in accordance with various aspects of the present disclosure.

FIG. 13 shows a flowchart illustrating a method 1300 for flexible GMSK in a cellular IoT system in accordance with various aspects of the present disclosure. The operations of method 1300 may be implemented by a UE 115 or its components as described with reference to FIGS. 1-9. For example, the operations of method 1300 may be performed by the communication management module 610 as described with reference to FIGS. 6-10. In some examples, a UE 115 may execute a set of codes to control the functional elements of the UE 115 to perform the functions described below. Additionally or alternatively, the UE 115 may perform aspects the functions described below using special-purpose hardware. The method 1300 may also incorporate aspects of methods 1000, 1100, and 1200 of FIGS. 10-12.

At block 1305, the UE 115 may receive a narrowband resource allocation from a base station as described above with reference to FIGS. 2-5. In certain examples, the operations of block 1305 may be performed by the narrowband resource module 705 as described above with reference to FIG. 7.

At block 1310, the UE 115 may filter an outgoing message based on a filter bandwidth that is flexible in the digital domain as described above with reference to FIGS. 2-5. In certain examples, the operations of block 1320 may be performed by the Gaussian filter 815 as described above with reference to FIG. 8.

At block 1315, the UE 115 may modulate the outgoing message utilizing GMSK and SC-FDMA modulation as described above with reference to FIGS. 2-5. In certain examples, the operations of block 1310 may be performed by the GMSK/SC-FDMA modulator 710 as described above with reference to FIG. 7.

At block 1320, the UE 115 may transmit the outgoing message using the narrowband resource allocation as described above with reference to FIGS. 2-5. In certain examples, the operations of block 1315 may be performed by the transmitter 615 as described above with reference to FIG. 6.

Thus, methods 1000, 1100, 1200, and 1300 may provide for flexible GMSK in a cellular IoT system. It should be noted that methods 1000, 1100, 1200, and 1300 describe possible embodiment, and that the operations and the steps may be rearranged or otherwise modified such that other embodiments are possible. In some examples, aspects from two or more of the methods 1000, 1100, 1200, and 1300 may be combined.

The detailed description set forth above in connection with the appended drawings describes exemplary embodiments and does not represent all the embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and embodiments are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable read only memory (EEPROM), compact disk (CD) ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

Techniques described herein may be used for various wireless communications systems such as code division multiple access (CDMA), time division multiple access (TDMA), frequency division multiple access (FDMA), OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE), comprising:
   receiving, from a base station, a narrowband resource allocation based at least in part on a flexible bandwidth allocation that is adjusted based on transmit time and data rate, wherein the transmit time is inversely proportional to the flexible bandwidth allocation;
   modulating an outgoing message utilizing Gaussian minimum shift keying (GMSK) and single carrier frequency division multiple access (SC-FDMA) modulation, the outgoing message using a modulation scheme that is different from and results in a peak-to-average-power-ratio (PAPR) that is lower than that resulting from a modulation scheme used by an incoming message; and
   transmitting the outgoing message using the narrowband resource allocation.

2. The method of claim 1, further comprising:
   demodulating the incoming message utilizing orthogonal frequency division multiple access (OFDMA) modulation.

3. The method of claim 1, wherein modulating the outgoing message comprises:
   generating a symbol vector with an M-point discrete Fourier transform (DFT);
   filtering the symbol vector with a frequency domain Gaussian filter;
   generating a sample vector from the filtered symbol vector utilizing an inverse DFT; and
   modulating the sample vector utilizing GMSK.

4. The method of claim 1, wherein the narrowband resource allocation is based on a power limitation of the UE.

5. The method of claim 1, wherein a bandwidth of the narrowband resource allocation is a multiple of a smallest narrowband carrier bandwidth.

6. The method of claim 1, further comprising:
   filtering the outgoing message based on a filter bandwidth that is flexible in the digital domain.

7. The method of claim 6, wherein the filter bandwidth is increased proportionally based on the flexible bandwidth allocation.

8. The method of claim 1, wherein the flexible bandwidth allocation is based at least in part on a path loss between a base station and the UE.

9. The method of claim 1, wherein modulating the outgoing message comprises:
   modulating the outgoing message based on a channel condition of the UE.

10. The method of claim 1, further comprising:
    exchanging data with a network based on machine type communication (MTC) procedures.

11. An apparatus for wireless communication at a user equipment (UE), comprising:
    means for receiving, from a base station, a narrowband resource allocation based at least in part on a flexible bandwidth allocation that is adjusted based on transmit time and data rate, wherein the transmit time is inversely proportional to the flexible bandwidth allocation;
    means for modulating an outgoing message utilizing Gaussian minimum shift keying (GMSK) and single carrier frequency division multiple access (SC-FDMA) modulation, the outgoing message using a modulation scheme that is different from and results in a peak-to-average-power-ratio (PAPR) that is lower than that resulting from a modulation scheme used by an incoming message; and
    means for transmitting the outgoing message using the narrowband resource allocation.

12. The apparatus of claim 11, further comprising:
means for demodulating the incoming message utilizing orthogonal frequency division multiple access (OFDMA) modulation.

13. The apparatus of claim 11, wherein modulating the outgoing message comprises:
generating a symbol vector with an M-point discrete Fourier transform (DFT);
filtering the symbol vector with a frequency domain Gaussian filter;
generating a sample vector from the filtered symbol vector utilizing an inverse DFT; and
modulating the sample vector utilizing GMSK.

14. The apparatus of claim 11, wherein the narrowband resource allocation is based on a power limitation of the UE.

15. The apparatus of claim 11, wherein a bandwidth of the narrowband resource allocation is a multiple of a smallest narrowband carrier bandwidth.

16. The apparatus of claim 11, further comprising:
means for filtering the outgoing message based on a filter bandwidth that is flexible in the digital domain.

17. The apparatus of claim 16, wherein the filter bandwidth is increased proportionally based on the flexible bandwidth allocation.

18. The apparatus of claim 11, wherein the flexible bandwidth allocation is based at least in part on a path loss between a base station and the UE.

19. The apparatus of claim 11, wherein modulating the outgoing message comprises:
modulating the outgoing message based on a channel condition of the UE.

20. The apparatus of claim 11, further comprising:
means for exchanging data with a network based on machine type communication (MTC) procedures.

21. An apparatus for wireless communication at a user equipment (UE), comprising:
a processor;
memory in electronic communication with the processor; and
instructions stored in the memory; wherein the instructions are executable by the processor to:
receive, from a base station, a narrowband resource allocation based at least in part on a flexible bandwidth allocation that is adjusted based on transmit time and data rate, wherein the transmit time is inversely proportional to the flexible bandwidth allocation;
modulate an outgoing message utilizing Gaussian minimum shift keying (GMSK) and single carrier frequency division multiple access (SC-FDMA) modulation, the outgoing message using a modulation scheme that is different from and results in a peak-to-average-power-ratio (PAPR) that is lower than that resulting from a modulation scheme used by an incoming message; and
transmit the outgoing message using the narrowband resource allocation.

22. The apparatus of claim 21, wherein the instructions are executable by the processor to:
demodulate the incoming message utilizing orthogonal frequency division multiple access (OFDMA) modulation.

23. The apparatus of claim 21, wherein modulating the outgoing message comprises:
generating a symbol vector with an M-point discrete Fourier transform (DFT);
wherein the instructions are executable by the processor to filter the symbol vector with a frequency domain Gaussian filter;
generate a sample vector from the filtered symbol vector utilizing an inverse DFT; and
modulate the sample vector utilizing GMSK.

24. The apparatus of claim 21, wherein the narrowband resource allocation is based on a power limitation of the UE.

25. The apparatus of claim 21, wherein a bandwidth of the narrowband resource allocation is a multiple of a smallest narrowband carrier bandwidth.

26. A non-transitory computer-readable medium storing code for wireless communication at a user equipment (UE), the code comprising instructions executable to:
receive, from a base station, a narrowband resource allocation based at least in part on a flexible bandwidth allocation that is adjusted based on transmit time and data rate, wherein the transmit time is inversely proportional to the flexible bandwidth allocation;
modulate an outgoing message utilizing Gaussian minimum shift keying (GMSK) and single carrier frequency division multiple access (SC-FDMA) modulation, the outgoing message using a modulation scheme that is different from and results in a peak-to-average-power-ratio (PAPR) that is lower than that resulting from a modulation scheme used by an incoming message; and
transmit the outgoing message using the narrowband resource allocation.

\* \* \* \* \*